United States Patent
Tao et al.

(10) Patent No.: US 12,052,109 B2
(45) Date of Patent: Jul. 30, 2024

(54) RETRANSMISSION MECHANISM FOR CONFIGURED GRANT UPLINK TRANSMISSION

(71) Applicant: Nokia Technologies Oy, Espoo (FI)

(72) Inventors: Tao Tao, Shanghai (CN); Chunli Wu, Beijing (CN); Timo Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 423 days.

(21) Appl. No.: 17/625,301

(22) PCT Filed: Aug. 6, 2019

(86) PCT No.: PCT/CN2019/099474
§ 371 (c)(1),
(2) Date: Jan. 6, 2022

(87) PCT Pub. No.: WO2021/022485
PCT Pub. Date: Feb. 11, 2021

(65) Prior Publication Data
US 2022/0255672 A1  Aug. 11, 2022

(51) Int. Cl.
*H04L 1/1867* (2023.01)
*H04L 1/1812* (2023.01)
(Continued)

(52) U.S. Cl.
CPC ............ *H04L 1/188* (2013.01); *H04L 1/1812* (2013.01); *H04L 1/1854* (2013.01); *H04W 72/23* (2023.01)

(58) Field of Classification Search
CPC ..... H04L 1/188; H04L 1/1812; H04L 1/1854; H04W 72/23
See application file for complete search history.

(56) References Cited

U.S. PATENT DOCUMENTS

| | | | |
|---|---|---|---|
| 2011/0026495 A1* | 2/2011 | Lee .................. | H04W 36/0011 370/335 |
| 2013/0166983 A1* | 6/2013 | Graumann ........... | H04L 1/1812 714/749 |

(Continued)

FOREIGN PATENT DOCUMENTS

| | | |
|---|---|---|
| CN | 105450368 A | 3/2016 |
| KR | 20090092708 A | 9/2009 |

(Continued)

OTHER PUBLICATIONS

Office action received for corresponding Indian Patent Application No. 202247011298, dated Jul. 19, 2022, 6 pages.

(Continued)

*Primary Examiner* — Jael M Ulysse
(74) *Attorney, Agent, or Firm* — Robert P. Michal, Esq.; Carter, DeLuca & Farrell LLP

(57) ABSTRACT

Embodiments of the present disclosure relate to devices, methods, apparatuses and computer readable storage media of retransmission mechanism for configured grant uplink transmission. The method comprising transmitting, to a second device, a transport block while starting a configured grant retransmission timer for autonomous retransmission of the transport block; in response to receiving, from the second device, a feedback indicating unsuccessful reception of the transport block, adjusting expiry time of the configured grant retransmission timer without starting the autonomous retransmission of the transport block; determining whether scheduling information for retransmission of the transport block is received before the adjusted configured grant retransmission timer expires; and in response to determining that the scheduling information is received, retransmitting the transport block while stopping the configured grant retransmission timer. In this way, the retransmission in the Hybrid Automatic Repeat Request process could be (Continued)

performed according to the uplink grant scheduled by the network device and therefore the retransmission efficiency for configured grant uplink transmission in unlicensed spectrum can be improved.

15 Claims, 5 Drawing Sheets

(51) Int. Cl.
*H04L 1/1829* (2023.01)
*H04W 72/23* (2023.01)

(56) References Cited

U.S. PATENT DOCUMENTS

| | | | |
|---|---|---|---|
| 2014/0086112 A1* | 3/2014 | Stern-Berkowitz | H04L 1/1854 370/280 |
| 2014/0269397 A1* | 9/2014 | Pelletier | H04W 24/00 370/252 |
| 2014/0269629 A1* | 9/2014 | Yang | H04L 1/1896 370/336 |
| 2014/0274083 A1* | 9/2014 | Sheik | H04L 1/1858 455/450 |
| 2016/0261382 A1* | 9/2016 | Vajapeyam | H04L 1/188 |
| 2016/0366722 A1* | 12/2016 | Heo | H04W 36/0083 |
| 2017/0041102 A1* | 2/2017 | Lu | H04L 1/08 |
| 2017/0202054 A1* | 7/2017 | Rathonyi | H04W 72/23 |
| 2017/0318620 A1* | 11/2017 | Tseng | H04L 1/08 |
| 2017/0339744 A1* | 11/2017 | Latheef | H04W 52/0235 |
| 2018/0367255 A1* | 12/2018 | Jeon | H04W 72/23 |
| 2019/0052413 A1* | 2/2019 | Babaei | H04L 1/1887 |
| 2019/0097762 A1* | 3/2019 | Jeon | H04L 1/1864 |
| 2019/0158229 A1* | 5/2019 | Wei | H04L 1/1848 |
| 2019/0208538 A1* | 7/2019 | Lee | H04W 76/28 |
| 2019/0215104 A1* | 7/2019 | Salem | H04W 80/02 |
| 2020/0037359 A1* | 1/2020 | Wang | H04L 1/1812 |
| 2020/0106498 A1* | 4/2020 | Zhou | H04B 7/0695 |
| 2020/0177318 A1* | 6/2020 | Belleschi | H04W 72/53 |
| 2020/0221310 A1* | 7/2020 | Babaei | H04W 72/0466 |
| 2020/0260486 A1* | 8/2020 | Zhou | H04L 1/1835 |
| 2020/0274654 A1* | 8/2020 | Loehr | H04W 72/23 |
| 2020/0314658 A1* | 10/2020 | Bergström | H04W 72/21 |
| 2020/0351030 A1* | 11/2020 | Deogun | H04W 74/0808 |
| 2020/0351832 A1* | 11/2020 | Baek | H04W 72/04 |
| 2020/0351936 A1* | 11/2020 | Kunt | H04L 1/08 |
| 2020/0367097 A1* | 11/2020 | Tarimala | H04L 1/1896 |
| 2021/0250980 A1* | 8/2021 | Xue | H04W 52/0216 |
| 2021/0266112 A1* | 8/2021 | Deogun | H04L 1/1819 |
| 2022/0104306 A1* | 3/2022 | Shrestha | H04W 76/27 |
| 2022/0183049 A1* | 6/2022 | Lee | H04W 76/20 |
| 2022/0264631 A1* | 8/2022 | Wang | H04L 1/188 |
| 2022/0272738 A1* | 8/2022 | Liu | H04L 1/1812 |
| 2022/0361234 A1* | 11/2022 | Kunt | H04L 1/189 |
| 2023/0319829 A1* | 10/2023 | Liu | H04W 72/23 370/329 |
| 2024/0080142 A1* | 3/2024 | El Hamss | H04L 1/1864 |
| 2024/0090029 A1* | 3/2024 | Babaei | H04W 28/0278 |

FOREIGN PATENT DOCUMENTS

| | | | | |
|---|---|---|---|---|
| WO | WO-2015023067 A1 * | 2/2015 | ............ | H04W 24/04 |
| WO | 2019/030726 A1 | 2/2019 | | |
| WO | WO-2019030726 A1 * | 2/2019 | ............ | H04L 1/1819 |

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"3rd Generation Partnership Project; Technical Specification Group Radio Access Network; Study on NR-based access to unlicensed spectrum (Release 16)", 3GPP TR 38.889, V16.0.0 , Dec. 2018, pp. 1-119.

"New WID on NR-based Access to Unlicensed Spectrum", 3GPP TSG RAN Meeting #82, RP-182878, Agenda: 9.1.1, Qualcomm Incorporated, Dec. 10-13, 2018, 8 pages.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; NR; Physical layer procedures for control (Release 15)", 3GPP TS 38.213, V15.5.0, Mar. 2019, pp. 1-104.

"3rd Generation Partnership Project; Technical Specification Group Radio Access Network; NR; Multiplexing and channel coding (Release 15)", 3GPP TS 38.212, V15.5.0, Mar. 2019, pp. 1-101.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.6.0, Jun. 2019, pp. 1-365.

"3rd Generation Partnership Project; Technical Specification Group Radio Access Network; Evolved Universal Terrestrial Radio Access (E-UTRA); Physical layer procedures (Release 15)", 3GPP TS 36.213, V15.6.0, Jun. 2019, pp. 1-551.

International Search Report and Written Opinion received for corresponding Patent Cooperation Treaty Application No. PCT/CN2019/099474, dated Apr. 29, 2020, 9 pages.

"Configured grant retransmission timer", 3GPP TSG-RAN WG2 Meeting #106, R2-1907056, Agenda: 11.2.1.2, MediaTek Inc, May 13-17, 2019, 3 pages.

"Configured grant operation for NR-U", 3GPP TSG-RAN WG2 Meeting #106, R2-1906757, Agenda: 11.2.1.2, Nokia, May 13-17, 2019, 3 pages.

Office action received for corresponding Chinese Patent Application No. 201980099028.6, dated Sep. 13, 2023, 3 pages of office action and 2 pages of translation available.

Extended European Search Report received for corresponding European Patent Application No. 19940411.2, dated Mar. 21, 2023, 9 pages.

"Transmission with configured grant in NR unlicensed band", 3GPP TSG RAN WG1 Meeting #97, R1-1906047, Agenda: 7.2.2.2.4, Huawei, May 13-17, 2019, 22 pages.

Office action received for corresponding Chinese Patent Application No. 201980099028.6, dated Mar. 25, 2023, 5 pages of office action and no page of translation available.

\* cited by examiner

RETRANSMISSION MECHANISM FOR CONFIGURED GRANT UPLINK TRANSMISSION

RELATED APPLICATION

This application claims priority to PCT Application No. PCT/CN2019/099474, filed on Aug. 6, 2019 the contents of which is incorporated herein by reference in its entirety.

FIELD

Embodiments of the present disclosure generally relate to the field of telecommunication and in particular, to devices, methods, apparatuses and computer readable storage media of retransmission mechanism for configured grant uplink transmission.

BACKGROUND

It has been agreed uplink (UL) scheduling with Configured Grants (CG) in New Radio (NR). In NR solution for UL transmission with CG, the network device can allocate UL resources for the initial Hybrid Automatic Repeat Request (HARQ) transmissions to terminal devices. Furthermore, two types configured grant mechanisms are supported in NR. For NR-U, there is no necessity to exclude Type-1 or Type-2 configured grant mechanism for operation of NR in unlicensed spectrum.

Currently, three retransmission modes are supported for CG UL transmission in New Radio-Unlicensed (NR-U). As an option, the retransmission may be scheduled via dynamic UL grant. As another option, when the terminal device receives NACK feedback via Downlink Feedback Indication (DFI) for the corresponding HARQ process, an autonomous retransmission on CG resources may be initiated. Furthermore, when a "CG retransmission timer" expires, an autonomous retransmission on CG resources may also be initiated.

SUMMARY

In general, example embodiments of the present disclosure provide a solution of retransmission mechanism for configured grant uplink transmission.

In a first aspect, there is provided a first device. The first device comprises at least one processor; and at least one memory including computer program codes; the at least one memory and the computer program codes are configured to, with the at least one processor, cause the first device at least to transmit, to a second device, a transport block while starting a configured grant retransmission timer for autonomous retransmission of the transport block; in response to receiving, from the second device, a feedback indicating unsuccessful reception of the transport block, adjust expiry time of the configured grant retransmission timer without starting the autonomous retransmission of the transport block; determine whether scheduling information for retransmission of the transport block is received before the adjusted configured grant retransmission timer expires; and in response to determining that the scheduling information is received, retransmit the transport block while stopping the configured grant retransmission timer.

In a second aspect, there is provided a second device. The second device comprises at least one processor; and at least one memory including computer program codes; the at least one memory and the computer program codes are configured to, with the at least one processor, cause the second device at least to receive a transport block from the first device; and in response to a failure in decoding the transport block, transmit a feedback indicating unsuccessful reception of the transport block to the first device to trigger the first device to adjust expiry time of the configured grant retransmission timer.

In a third aspect, there is provided a method. The method comprises transmitting, to a second device, a transport block while starting a configured grant retransmission timer for autonomous retransmission of the transport block; in response to receiving, from the second device, a feedback indicating unsuccessful reception of the transport block, adjusting expiry time of the configured grant retransmission timer without starting the autonomous retransmission of the transport block; determining whether scheduling information for retransmission of the transport block is received before the adjusted configured grant retransmission timer expires; and in response to determining that the scheduling information is received, retransmitting the transport block while stopping the configured grant retransmission timer.

In a fourth aspect, there is provided a method. The method comprises receiving a transport block from the first device; and in response to a failure in decoding the transport block, transmitting a feedback indicating unsuccessful reception of the transport block to the first device to trigger the first device to adjust expiry time of the configured grant retransmission timer.

In a fifth aspect, there is provided an apparatus comprises means for transmitting, to a second device, a transport block while starting a configured grant retransmission timer for autonomous retransmission of the transport block; means for in response to receiving, from the second device, a feedback indicating unsuccessful reception of the transport block, adjusting expiry time of the configured grant retransmission timer without starting the autonomous retransmission of the transport block; means for determining whether scheduling information for retransmission of the transport block is received before the adjusted configured grant retransmission timer expires; and means for in response to determining that the scheduling information is received, retransmitting the transport block while stopping the configured grant retransmission timer.

In a sixth aspect, there is provided an apparatus comprises means for receiving a transport block from the first device; and means for in response to a failure in decoding the transport block, transmitting a feedback indicating unsuccessful reception of the transport block to the first device to trigger the first device to adjust expiry time of the configured grant retransmission timer.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
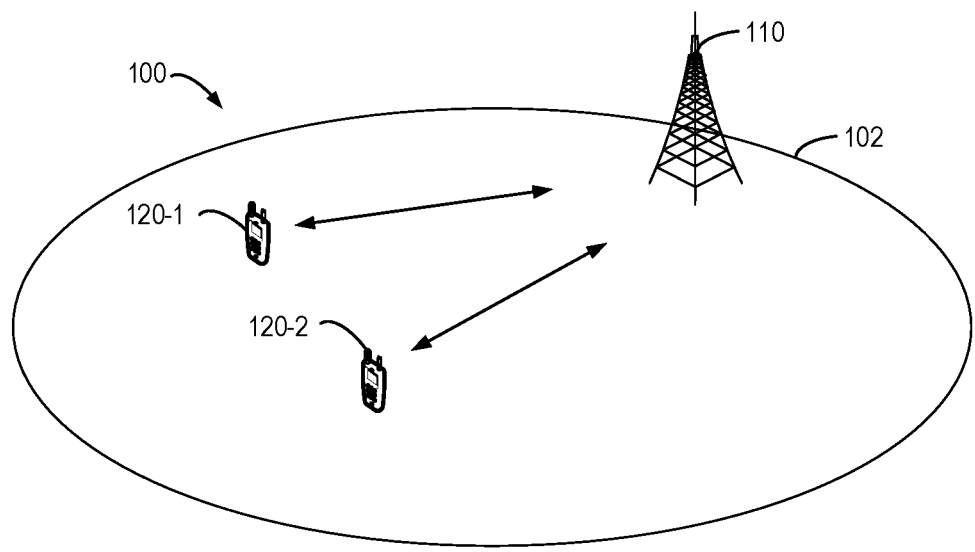
FIG. 1 shows an example communication network in which example embodiments of the present disclosure may be implemented.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on.

Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 shows an example communication network 100 in which embodiments of the present disclosure can be implemented. The network 100 includes a second device 110 (hereinafter may be referred as to a network device 110) and first devices 120-1 and 120-2 (hereinafter collectively referred to as first devices 120 or individually referred to as a terminal device 120) served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 102 and served by the network device 110.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, it has been agreed uplink (UL) scheduling with Configured Grants (CG) in NR. In UL, the network device can dynamically allocate resources to terminal devices via the Cell-Radio Network Temporary Identity (C-RNTI) on the Physical Downlink Control Channels (PDCCHs). A terminal device may always monitor the PDCCHs in order to find possible grants for UL transmission when its downlink (DL) reception is enabled. In addition, with the CG, the network device can allocate UL resources for the initial Hybrid Automatic Repeat Request (HARQ) transmissions to terminal devices.

It has been agreed uplink (UL) scheduling with Configured Grants (CG) in New Radio (NR). In NR solution for UL transmission with CG, the network device can allocate UL resources for the initial Hybrid Automatic Repeat Request (HARQ) transmissions to terminal devices. Furthermore, two types configured grant mechanisms are supported in NR. For NR-U, there is no necessity to exclude Type-1 or Type-2 configured grant mechanism for operation of NR in unlicensed spectrum.

As mentioned above, two types of configured uplink grants are defined. With type 1, a Radio Resource Control (RRC) signaling directly provides the configured uplink grant (including the periodicity). With Type 2, RRC signaling defines the periodicity of the configured uplink grant while PDCCH addressed to Configured Scheduling-Radio Network Temporary Identity (CS-RNTI) can either signal and activate the configured uplink grant, or deactivate it; i.e. a PDCCH addressed to CS-RNTI uplink grant can be implicitly reused according to the periodicity defined by RRC, until deactivated.

When a configured uplink grant is active, if the terminal device cannot find its C-RNTI/CS-RNTI on the PDCCH, an uplink transmission according to the configured uplink grant can be made. Otherwise, if the terminal device finds its C-RNTI/CS-RNTI on the PDCCH, the PDCCH allocation overrides the configured uplink grant.

A similar mechanism referred to "Autonomous UL Access (AUL)" has been introduced to LTE for supporting autonomous UL transmissions on unlicensed spectrum. The terminal device may be configured with a set of subframes and HARQ processes using for autonomous Physical Uplink Share Channel (PUSCH) transmissions via RRC signalling. The AUL operation may be activated and released with Downlink Control Information (DCI) format 0A or 4A. The terminal device may skip the AUL allocation if there is no data in UL buffers. The resource allocation, Modulation and Coding Scheme (MCS), as well as Demodulation Reference Signal (DMRS) cyclic shift and orthogonal cover code are indicated to the terminal device with AUL activation DCI.

Furthermore, the terminal device may indicate, to the network device, the selected HARQ-process ID, new data indicator, redundancy version, ID of the terminal device, PUSCH starting and ending points along with each UL transmission, as well as whether the terminal device acquired channel occupancy time (COT) can be shared with the network device. The network device may provide, to the terminal device, HARQ feedback for AUL-enabled HARQ processes and transmit power control (TPC) command and Precoding Matrix Indicator (PMI) via a DL control signalling message called AUL—Downlink Feedback Indication (DFI).

AUL also allows for configuring a set of starting positions for terminal devices with a very fine raster within the first SC-FDMA symbol of a subframe: 16, 25, 34, 43, 52, or 61 microseconds after the subframe boundary, or at the beginning of symbol #1. Since all terminal devices perform listen-before-talk operation prior to the AUL transmission to determine whether the channel is free, different starting points allow for e.g. prioritizing transmissions for certain terminal devices (by assigning an earlier starting point) and reducing the number of collisions. The transmission within the $1^{st}$ symbol is not PUSCH data but instead a very long CP extended from the next symbol #2. In fact, the CP extension is used for reserving the channel for the given terminal device by blocking other terminal devices.

In NU-R, three retransmission modes are supported for configured grant UL transmission. As an option, the retransmission may be scheduled by dynamic UL grant. As another option, when the terminal device receives NACK feedback via DFI for the corresponding HARQ process, an autonomous retransmission may be initiated on configured grant resources. Further, an autonomous retransmission may be initiated when a Configured Grant retransmission timer (hereafter may be referred to CG retransmission timer) expires.

The behaviour of the CG retransmission timer has been agreed. This timer is introduced for autonomous retransmission (i.e. timer expiry=HARQ NACK) on configured grant for the case of the transport block (TB) previous being transmitted on a configured grant. The CG retransmission timer is started when the TB is actually transmitted on the configured grant and stopped upon reception of DFI or dynamic grant for the HARQ process.

It has been agreed that the terminal device will rely on the scheduling of the network device rather than on automatic retransmission, when the network device responded a CG PUSCH transmission. However, the LTE behaviour defines that the retransmission timer is stopped after the terminal device receives from the network device a NACK for the given HARQ process. Automatic retransmission can happen when NACK has been received while the timer is not running.

Therefore, it is not clear that the behaviour of the terminal device when it receives a NACK feedback via DFI for a corresponding HARQ process. The terminal device may prepare an autonomous retransmission and try to access the channel when it receives NACK via DFI. However, the network device may also try to access the channel to send UL grant to the terminal device for a scheduled retransmission at the same time. Allowing both would cause a HARQ process racing/collision issue.

To avoid this ambiguous behaviour, it has been proposed that the UL grant for retransmission of a configured grant HARQ process may be transmitted along with the DFI (i.e. HARQ-NACK) or at previous slot(s) than transmitting the DFI.

DFI for HARQ feedback could indicate feedback for multiple HARQ processes with a bitmap having a dedicated bit corresponding to each HARQ process. Assuming reusing the same approach in the NR-U, the CG retransmission timer will stop upon reception of NACK. When the CG retransmission timer stops, the network device may not schedule the HARQ process initially transmitted via a configured grant resource. Therefore, it may happen that only a limited number of HARQ processes can be retransmitted via scheduled mode, as the terminal device only expects up to two uni-cast UL grants in one slot.

Figure 2:
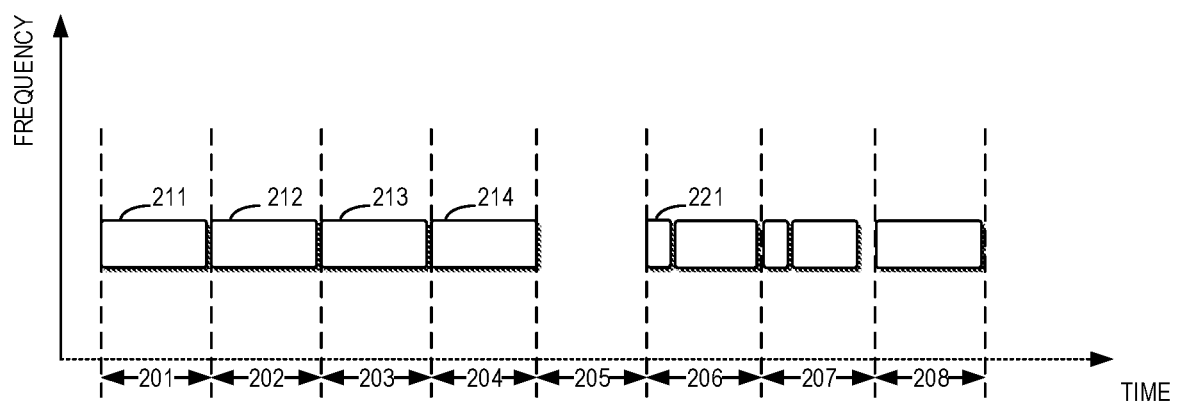
FIG. 2 shows a conventional retransmission process for configured grant uplink transmission.

FIG. 2 shows a conventional retransmission process for configured grant uplink transmission. As shown in FIG. 2, one terminal device has CG UL transmission in slots 201 to 204. Unfortunately, all these transmissions cannot be decoded by the network device (e.g., due to strong interference or a collision with another terminal device transmission). Assuming that network device finishes the LBT operation to gain the channel access at slot 206, the network device will feedback NACKs to the terminal device for corresponding HARQ processes 211-214. Due to the limitation of terminal device capability, the network device can only provide a UL grant (in PDCCH 221) to the terminal device at slot 206 for re-transmitting failed transport block with HARQ process ID 211. The other three transport blocks will only rely on autonomous retransmission in configured grant resources. Actually, the network device is able to send UL grant in the following slots to schedule more retransmissions.

Therefore, in order to improve the reliability and latency performance of pending HARQ processes for retransmission, a new method to allow the network device continuing to send UL grants for retransmission of a configured grant HARQ process even after indicating the NACK for the corresponding HARQ process to the terminal device may be discuss as below.

Figure 3:
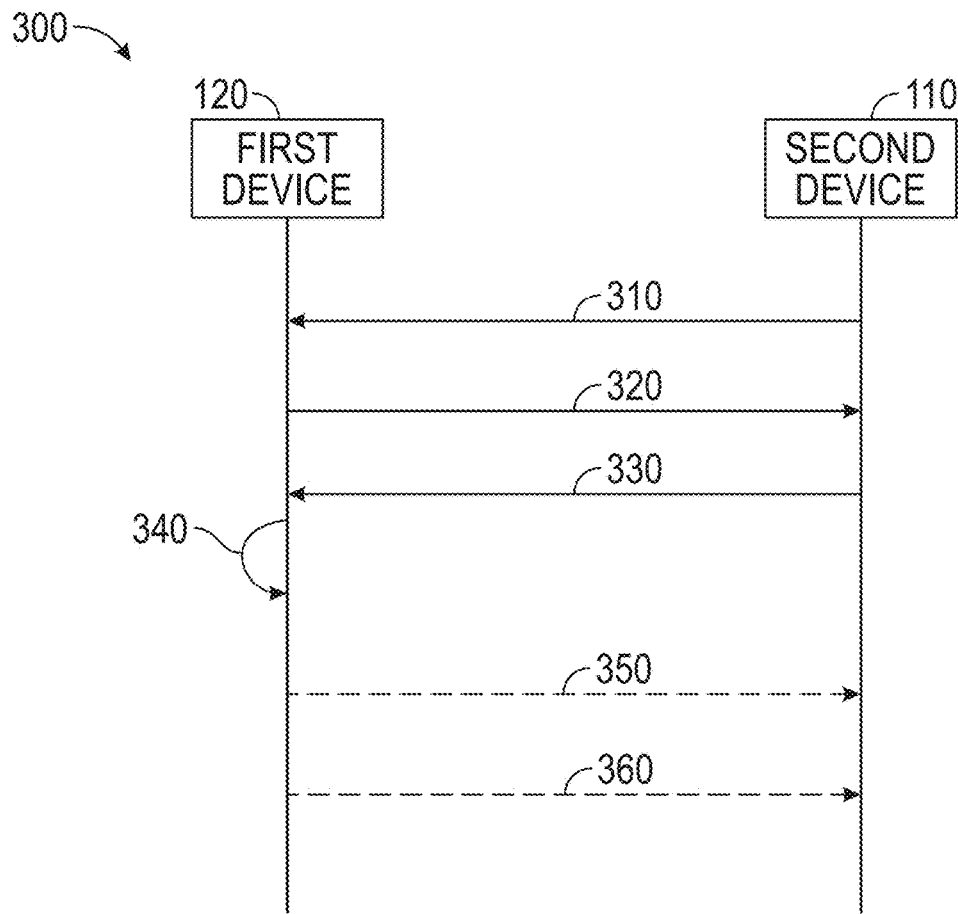
FIG. 3 shows a schematic diagram illustrating a process 300 of retransmission for configured grant uplink transmission according to example embodiments of the present disclosure.

Principle and implementations of the present disclosure will be described in detail below with reference to FIG. 3, which shows a schematic diagram of a process 300 of retransmission for configured grant uplink transmission according to example embodiments of the present disclosure. For the purpose of discussion, the process 300 will be described with reference to FIG. 1. The process 300 may involve the network device 110 and the terminal device 120 as illustrated in FIG. 1.

The network device 110 may transmit 310 Downlink Control Information (DCI) to the terminal device 120. The DCI may comprise configuration information to indicate the configured UL grant for the transmission from the terminal device 120 to the network device 110. Further, the DCI may also comprise a value of the CG retransmission timer to indicate a time interval after which the autonomous retransmission may be initiated without receiving a feedback from the network device.

The terminal device 120 may build a TB to be transmitted and transmit 320 the TB on the resource indicated by the received configuration information for configured UL grant transmission. The network device 110 may decode the TB to obtain the data transmitted from the terminal device 120. If the network device 110 determines a failure in decoding the transport block, the network device 110 may transmit 330 a DFI indicating unsuccessful reception of the TB, i.e. a HARQ-NACK to the terminal device 120.

If the terminal device 120 receives the DFI and aware of the unsuccessful reception of the TB, the terminal device 120 adjust 340 expiry time of the CG retransmission timer without starting the autonomous retransmission of TB.

In some example embodiments, for adjusting expiry time, the terminal device 120 may defer expiry of the CG retransmission timer for a certain time period. A CG retransmission timer may be expired/ceased when the terminal device 120 receives a HARQ-NACK. However, for waiting the UL grant scheduled by the network device 110 for the retransmission in the HARQ process, the terminal device 120 may defer the cease of the CG retransmission timer for a certain time period.

As another option, the terminal device 120 may adjust the adjusting the expiry time of configured grant retransmission timer according to the time period. That is, regardless of how long it takes for the timer to expire and the terminal device 120 may set the expiry time to a new certain time period. The process may be considered as a new timer is running after receiving a HARQ-NACK.

As a further option, after receiving the HARQ-NACK at the physical layer of the terminal device 120, the HARQ-NACK may be suspended for a certain time period to defer the delivery of the HARQ-NACK to the MAC layer. That is, the CG retransmission timer may not be stopped even if the HARQ-NACK is arrived. The PHY layer may only delivers the HARQ-NACK if no scheduling information is received within the certain time period.

The certain time period for adjusting the timer may be obtain from the network device 110 or determined by the terminal device 110 itself. Alternatively, the certain time could be pre-defined/configured in the specification.

In some example embodiments, the terminal device 120 may obtain the time period associated with expiry time to be adjusted from the DCI. In some example embodiments, the terminal device 120 may obtain the time period associated with expiry time to be adjusted from the DFI. In some example embodiments, the terminal device 120 may obtain the time period associated with expiry time to be adjusted via RRC signaling when establishing the connection between the terminal device and network device.

In some example embodiments, the terminal device 120 may determine the time period associated with expiry time to be adjusted. The terminal device 120 may determine the number of HARQ processes to be transmission based on the feedback. That is, the number of HARQ-NACK indicated in DFI. Based on the number of HARQ processes to be transmission, the terminal device 120 may determine the number of occasions to be monitored for receiving UL grant from the network device 110. The time period associated with expiry time to be adjusted may be determined based on the time interval corresponding to the determined number of occasions.

Referring back to FIG. 2, in the determined time period of the adjusted CG retransmission timer, the terminal device 120 may monitor the PDCCH to determine whether there is scheduling information indicating the UL grant transmitted from the network device 110 before the adjusted configured grant retransmission timer expires. If so, the terminal device 120 retransmits 350 the TB based on the scheduling information while stopping the CG retransmission timer.

In some example embodiments, if the terminal device 120 does not receive the scheduling information, the terminal device 120 may initiate the autonomous retransmission of the TB for HARQ process on the configured UL grant.

Figure 4:
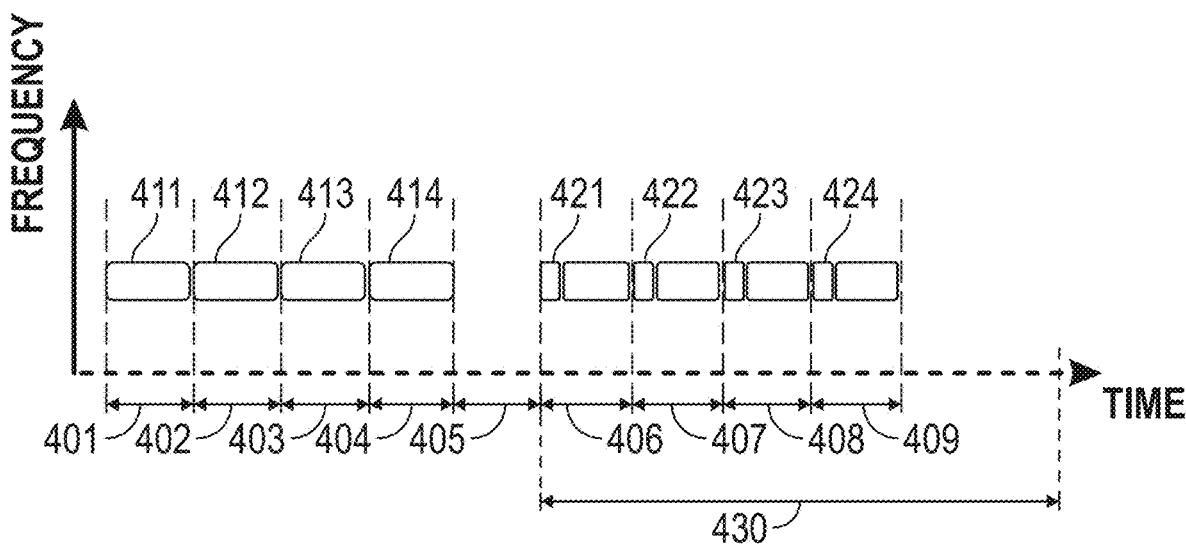
FIG. 4 shows a diagram of an example retransmission process for configured grant uplink transmission according to some example embodiments of the present disclosure.

FIG. 4 shows a diagram of an example retransmission process for configured grant uplink transmission according to some example embodiments of the present disclosure. With reference to FIG. 4 the concept for adjusting the CG retransmission timer according to the embodiments of the present disclosure may be further described in detail as below.

As shown in FIG. 4, there are CG transmissions from the terminal device 120 in slots from 401 to 404. The HARQ processes from 411 to 414 are used in slots from 401 to 404, respectively. The terminal device 120 receives HARQ feedback via CG-DFI in slot 406. As the network device 110 cannot decode HARQ processes 411 to 414, "NACKs" for corresponding HARQ processes (from 411 to 414) will be indicated in the CG-DFI.

As mentioned above, the CG retransmission timer will not stop immediately when the terminal device 120 receives Ack/Nack feedback for corresponding HARQ process via CG-DFI. The terminal device 120 defers the stop of the CG retransmission timer by an offset (e.g. a certain timer period 430).

Thus, for HARQ process 411, the CG retransmission timer associated with HARQ process 411 starts after slot 401, in which the CG UL transmission for HARQ process 411 is performed. The CG retransmission timer associated with HARQ process 401 stops after UE decodes PDCCH in slot 406, as the terminal device 120 receives NACK feedback and UL grant for HARQ process 411 in this PDCCH 421 occasion.

For for HARQ process 412, the CG retransmission timer associated with HARQ process 412 starts after slot 402, in which the CG UL transmission for HARQ process 412 is performed. When the terminal device 120 receives NACK feedback for HARQ process 412 via CG-DFI in slot 406, it adjusts the expiry of the timer in slots 406 and keeps monitoring PDCCHs from the network device 110. The CG retransmission timer associated with HARQ process 412 stops after the terminal device 120 decodes PDCCH in slot 407, as the terminal device 120 receives UL grant for HARQ process 412 in this PDCCH 422 occasion.

For for HARQ processes 413-414, the procedures are similar with HARQ process 403. The CG retransmission timer associated with HARQ process 413 starts after slot 403 and stops at slot 408. The CG retransmission timer associated with HARQ process 414 starts after slot 404 and stops at slot 409.

In some example embodiments, one of the signalling options may also be to disallow autonomous re-transmissions of the terminal device, i.e. the certain timer period 430 is set to infinite value.

In some example embodiments, another state (e.g., setting the certain timer period 430 to be 0) might disable scheduled retransmissions by the network device, i.e. the terminal device 120 may assume that all re-transmissions will occur on the CG resources.

In this way, the CG re-transmission flexibility may be increased and the retransmission efficiency for configured grant uplink transmission in unlicensed spectrum can be improved.

More details of the example embodiments in accordance with the present disclosure will be described with reference to FIGS. 5-6.

Figure 5:
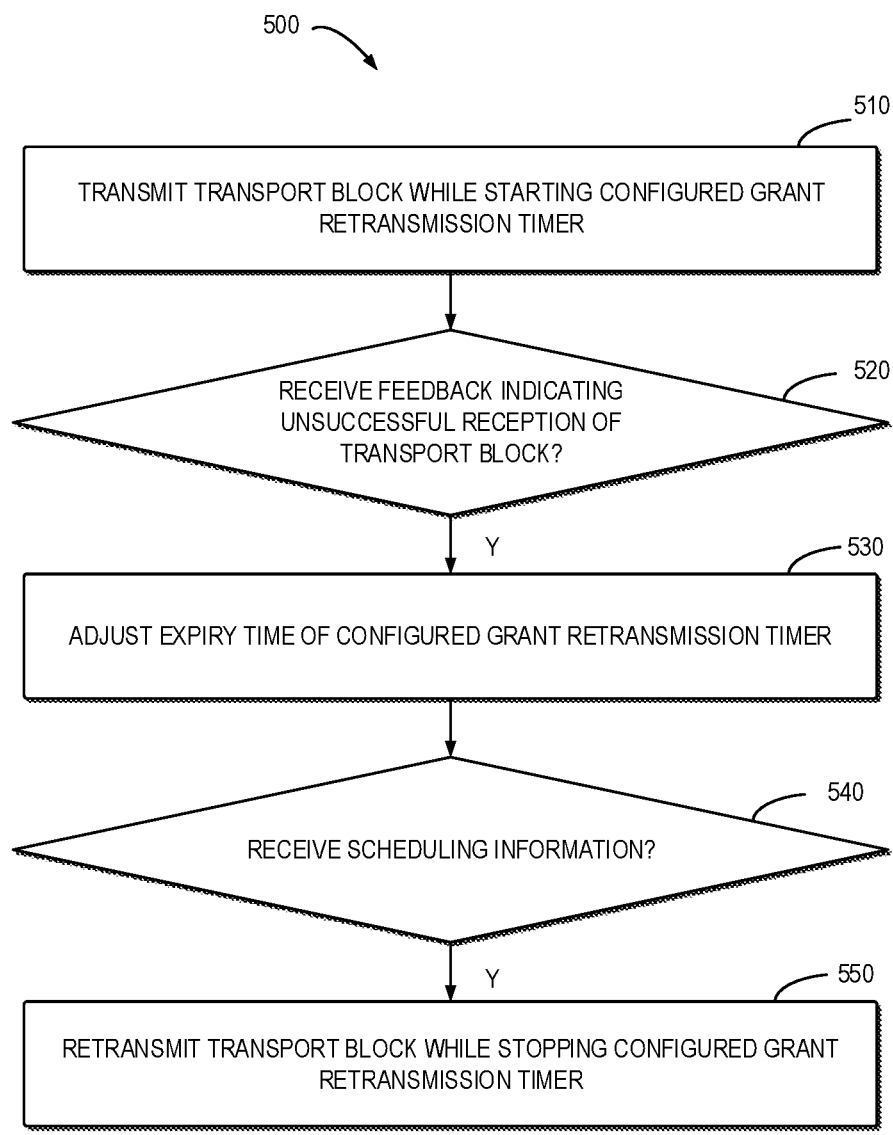
FIG. 5 shows a flowchart of an example method 500 of retransmission for configured grant uplink transmission according to some example embodiments of the present disclosure.

FIG. 5 shows a flowchart of an example method 500 of retransmission for configured grant uplink transmission according to some example embodiments of the present disclosure. The method 500 can be implemented at the terminal device 120 as shown in FIG. 1. For the purpose of discussion, the method 500 will be described with reference to FIG. 1.

At 510, the terminal device 120 transmits, to a network device 110, a transport block while starting a configured grant retransmission timer for autonomous retransmission of the transport block.

At 520, the terminal device 120 determines whether a feedback indicating unsuccessful reception of the transport block is received from the network device 110.

If the terminal device 120 determines the feedback is received, the terminal device 120, at 530, adjusts expiry time of the configured grant retransmission timer without starting the autonomous retransmission of the transport block.

At 540, the terminal device 120 determines whether scheduling information for retransmission of the transport block is received before the adjusted configured grant retransmission timer expires.

If the terminal device 120 determines the scheduling information is received, the terminal device 120, at 550, retransmits the transport block while stopping the configured grant retransmission timer.

In some example embodiments, the terminal device 120 may determine a time period associated with expiry time to be adjusted and defer expiry of the configured grant retransmission timer for the time period.

In some example embodiments, the terminal device 120 may determine a time period associated with expiry time to be adjusted and adjust the expiry time of configured grant retransmission timer according to the time period.

In some example embodiments, the terminal device 120 may receives control information for the transmission of the transport block from the second device and determine a time period associated with expiry time to be adjusted from the control information.

In some example embodiments, if the feedback is received at a physical layer, the terminal device 120 may suspend delivery of the feedback to a MAC layer of the first device for a time period associated with expiry time to be adjusted, to defer the expiry time of the configured grant retransmission timer.

In some example embodiments, the terminal device 120 may determine the time period associated with expiry time to be adjusted from the feedback.

In some example embodiments, the terminal device 120 may receive a radio resource control signaling from the second device and determine the time period associated with expiry time to be adjusted from the radio resource control signaling.

In some example embodiments, the terminal device 120 may determine, based on the feedback, the number of Hybrid Automatic Repeat Request processes to be retransmitted. The terminal device 120 may further determine, based on the number of Hybrid Automatic Repeat Request processes, the number of occasions to be monitored for receiving control information from the second device; and determine the time period associated with expiry time to be adjusted based on time interval corresponding to the number of occasions.

In some example embodiments, the time period is pre-configured.

In some example embodiments, if the terminal device 120 determines the scheduling information is received for the retransmission of the transport block before the adjusted configured grant retransmission timer expires, the terminal device 120 may initiate the autonomous retransmission of the transport block for Hybrid Automatic Repeat Request process.

Figure 6:
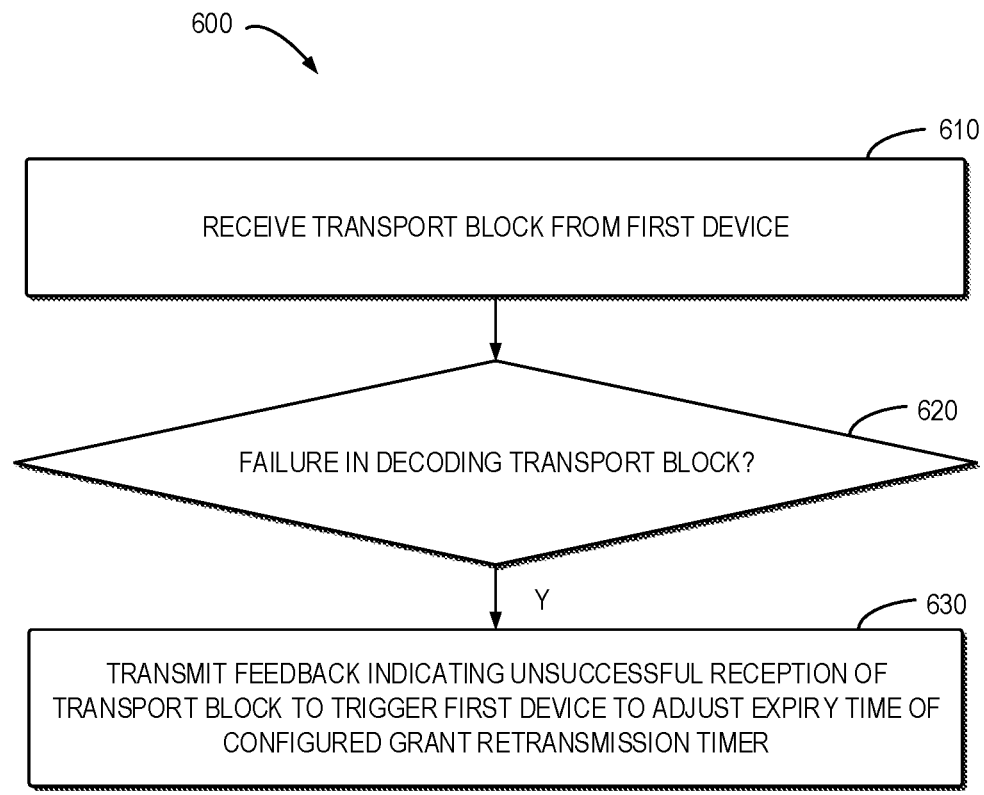
FIG. 6 shows a flowchart of an example method 600 of retransmission for configured grant uplink transmission according to some example embodiments of the present disclosure.

FIG. 6 shows a flowchart of an example method 600 of retransmission for configured grant uplink transmission according to some example embodiments of the present disclosure. The method 600 can be implemented at the network device 110 as shown in FIG. 1. For the purpose of discussion, the method 600 will be described with reference to FIG. 1.

At 610, the network device 110 receives a transport block from the first device.

At 620, the network device 110 determines whether there is a failure in decoding the transport block. If the network device 110 determines a failure in decoding the transport block, the network device 110, at 630, transmit a feedback indicating unsuccessful reception of the transport block to the first device to trigger the terminal device 120 to adjust expiry time of the configured grant retransmission timer.

In some example embodiments, the network device 110 may determine a time period associated with expiry time based on traffic load situation and/or a state of a channel between the first device and the second device and transmit an indication of the time period to the first device via control information.

In some example embodiments, the network device 110 may determine a time period associated with expiry time based on traffic load situation and/or a state of a channel between the first device and the second device; and transmit an indication of the time period to the first device via the feedback.

In some example embodiments, the network device 110 may transmit, to the terminal device, scheduling information for retransmission of the transport block.

In some example embodiments, an apparatus capable of performing the method 500 (for example, implemented at the terminal device 120) may comprise means for performing the respective steps of the method 500. The means may be implemented in any suitable form. For example, the means may be implemented in a circuitry or software module.

In some example embodiments, the apparatus comprises means for transmitting, to a second device, a transport block while starting a configured grant retransmission timer for autonomous retransmission of the transport block; means for in response to receiving, from the second device, a feedback indicating unsuccessful reception of the transport block, adjusting expiry time of the configured grant retransmission timer without starting the autonomous retransmission of the transport block; means for determining whether scheduling information for retransmission of the transport block is received before the adjusted configured grant retransmission timer expires; and means for in response to determining that the scheduling information is received, retransmitting the transport block while stopping the configured grant retransmission timer.

In some example embodiments, an apparatus capable of performing the method 600 (for example, implemented at the network device 110) may comprise means for performing the respective steps of the method 600. The means may be implemented in any suitable form. For example, the means may be implemented in a circuitry or software module.

In some example embodiments, the apparatus comprises means for receiving a transport block from the first device; and means for in response to a failure in decoding the transport block, transmitting a feedback indicating unsuccessful reception of the transport block to the first device to trigger the first device to adjust expiry time of the configured grant retransmission timer.

Figure 7:
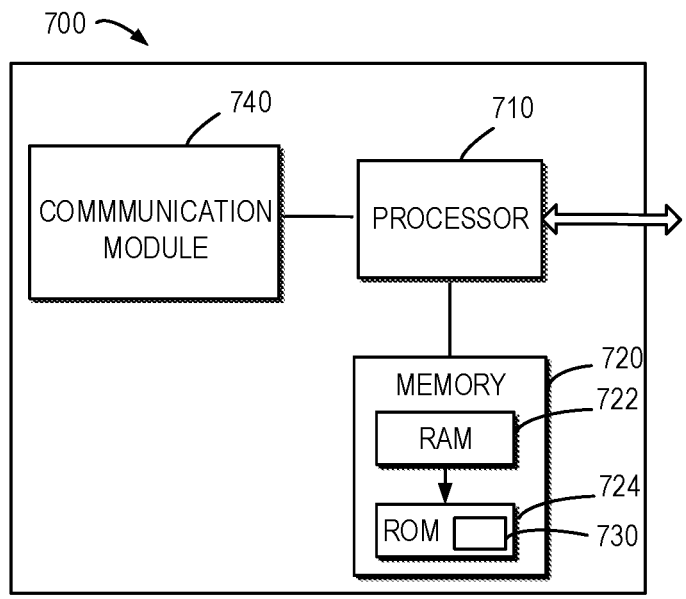
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the terminal device 120 and the network device 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 1020. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 3 to 6. The embodiments of the present disclosure may also be implemented by hardware or by a combination of software and hardware.

Figure 8:
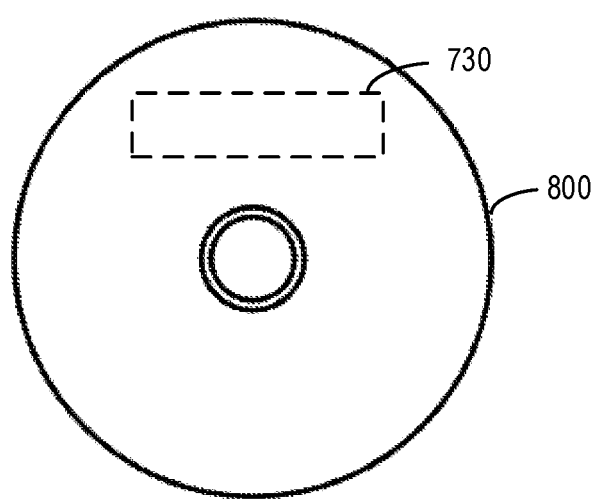
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device at least to:
transmit, to a second device, a transport block while starting a configured grant retransmission timer for autonomous retransmission of the transport block;
in response to receiving, from the second device, a feedback indicating unsuccessful reception of the transport block, adjust expiry time of the configured grant retransmission timer without starting the autonomous retransmission of the transport block;
determine whether scheduling information for retransmission of the transport block is received before the adjusted configured grant retransmission timer expires;
in response to determining that the scheduling information is received, retransmit the transport block while stopping the configured grant retransmission timer; and
wherein the first device is caused to adjust expiry time by:
in response to receiving the feedback at a physical layer of the first device, suspending delivery of the feedback to a MAC layer of the first device for a time period associated with expiry time to be adjusted, to defer the expiry time of the configured grant retransmission timer.

2. The first device of claim 1, wherein the first device is caused to adjust expiry time by:
determining a time period associated with expiry time to be adjusted; and
deferring expiry of the configured grant retransmission timer for the time period.

3. The first device of claim 2, wherein the first device is caused to determine the time period by:
receiving a control information from the second device; and
determining the time period associated with expiry time to be adjusted from the control information.

4. The first device of claim 2, wherein the first device is caused to determine the time period by:
determining the time period associated with expiry time to be adjusted from the feedback.

5. The first device of claim 2, wherein the first device is caused to determine the time period by:
receiving a radio resource control signaling from the second device; and
determining the time period associated with expiry time to be adjusted from the radio resource control signaling.

6. The first device of claim 2, wherein the first device is caused to determine the time period by:
- determining, based on the feedback, a number of Hybrid Automatic Repeat Request processes to be retransmitted;
- determining, based on the number of Hybrid Automatic Repeat Request processes to be retransmitted, a number of occasions to be monitored for receiving control information from the second device; and
- determining the time period associated with expiry time to be adjusted based on time interval corresponding to the number of occasions.

7. The first device of claim 2, wherein the time period is preconfigured.

8. The first device of claim 1, wherein the first device is caused to adjust expiry time by:
- determining a time period associated with expiry time to be adjusted; and
- adjusting the expiry time of configured grant retransmission timer according to the time period.

9. The first device of claim 1, wherein the first device is further caused to:
- in response to determining that the scheduling information is not received for the retransmission of the transport block before the adjusted configured grant retransmission timer expires, initiate the autonomous retransmission of the transport block for Hybrid Automatic Repeat Request process.

10. The first device of claim 1, wherein the first device is a terminal device and the second device is a network device.

11. A second device comprising:
- at least one processor; and
- at least one memory including computer program codes;
- the at least one memory and the computer program codes are configured to, with the at least one processor, cause the second device at least to:
  - receive a transport block from the first device; and
  - in response to a failure in decoding the transport block, transmit a feedback indicating unsuccessful reception of the transport block to the first device to trigger the first device to adjust expiry time of the configured grant retransmission timer;
- wherein the second device is further caused to:
  - determine a time period associated with expiry time based on a state of a channel between the first device and the second device; and
  - transmit an indication of the time period to the first device via control information for transmission of the transport block.

12. The second device of claim 11, wherein the second device is further caused to:
- determine a time period associated with expiry time based on a state of a channel between the first device and the second device; and
- transmit an indication of the time period to the first device via the feedback.

13. The second device of claim 11, wherein the second device is further caused to:
- transmit, to the first device, scheduling information for retransmission of the transport block.

14. The second device of claim 11, wherein the first device is a terminal device and the second device is a network device.

15. A first device comprising:
- at least one processor; and
- at least one memory including computer program codes;
- the at least one memory and the computer program codes are configured to, with the at least one processor, cause the first device at least to:
  - transmit, to a second device, a transport block while starting a configured grant retransmission timer for autonomous retransmission of the transport block;
  - in response to receiving, from the second device, a feedback indicating unsuccessful reception of the transport block, adjust expiry time of the configured grant retransmission timer without starting the autonomous retransmission of the transport block;
  - determine whether scheduling information for retransmission of the transport block is received before the adjusted configured grant retransmission timer expires; and
  - in response to determining that the scheduling information is received, retransmit the transport block while stopping the configured grant retransmission timer; and
- wherein the first device is caused to adjust expiry time by:
- determining a time period associated with expiry time to be adjusted; and
- deferring expiry of the configured grant retransmission timer for the time period; and
- wherein the first device is caused to determine the time period by:
- determining, based on the feedback, the number of Hybrid Automatic Repeat Request processes to be retransmitted;
- determining, based on the number of Hybrid Automatic Repeat Request processes to be retransmitted, the number of occasions to be monitored for receiving control information from the second device; and
- determining the time period associated with expiry time to be adjusted based on time interval corresponding to the number of occasions.

* * * * *